US00RE49494E

(19) United States
(12) Reissued Patent
Isaac et al.

(10) Patent Number: US RE49,494 E
(45) Date of Reissued Patent: Apr. 18, 2023

(54) SYSTEM AND METHOD FOR DESTROYING SEEDS IN CROP RESIDUE PRIOR TO DISCHARGE FROM AGRICULTURAL HARVESTER

(71) Applicant: Blue Leaf I.P, Inc., Wilmington, DE (US)

(72) Inventors: Nathan E. Isaac, Lancaster, PA (US); Martin J. Roberge, Saskatoon (CA); Jim Henry, Saskatoon (CA); Mark Dilts, Mohnton, PA (US)

(73) Assignee: Blue Leaf I.P., Inc., Wilmington, DE (US)

(21) Appl. No.: 17/344,454

(22) Filed: Jun. 10, 2021

Related U.S. Patent Documents

Reissue of:
(64) Patent No.: 10,314,232
Issued: Jun. 11, 2019
Appl. No.: 15/629,387
Filed: Jun. 21, 2017

(51) Int. Cl.
*A01D 41/12* (2006.01)
*B02C 13/20* (2006.01)
(Continued)

(52) U.S. Cl.
CPC ..... *A01D 41/1243* (2013.01); *A01F 12/00* (2013.01); *A01F 12/40* (2013.01);
(Continued)

(58) Field of Classification Search
CPC .. B02C 4/38; B02C 4/06; B02C 19/22; B02C 13/205; B02C 25/00; A01D 41/1243; A01F 12/00; A01F 12/40
See application file for complete search history.

(56) References Cited

U.S. PATENT DOCUMENTS 2,701,596 A 8/1948 Myrold
3,448,933 A 6/1969 Roy
(Continued)

FOREIGN PATENT DOCUMENTS

AU 771302 B2 10/2001
BE 539697 A 7/1955
(Continued)

OTHER PUBLICATIONS

Extended European Search Report for European Application No. 18178810.0, dated Nov. 6, 2018, 7 pages.

*Primary Examiner* — William C Doerrler
(74) *Attorney, Agent, or Firm* — Peter Zacharias; Patrick Sheldrake

(57) ABSTRACT

A system processes seeds that are present in crop material. The system includes a first shearing surface, a second shearing surface arranged opposite the first shearing surface, and a clearance between the first shearing surface and the second shearing surface. The system passes crop material between the first and second shearing surfaces, where the crop material contacts the shearing surfaces as it passes through the shearing surfaces. Contact with the first and second shearing surfaces damages seeds that are present in the crop material. The system can be installed in an agricultural harvester to damage seeds that are present in crop residue to prevent the seeds from germinating after the crop residue is discharged from the agricultural harvester back into the field.

39 Claims, 10 Drawing Sheets

(51) Int. Cl.

| | |
|---|---|
| ***A01F 12/40*** | (2006.01) |
| ***B02C 4/38*** | (2006.01) |
| ***B02C 25/00*** | (2006.01) |
| ***A01F 12/00*** | (2006.01) |
| ***B02C 4/06*** | (2006.01) |
| ***B02C 19/22*** | (2006.01) |

(52) U.S. Cl.
CPC ..... *B02C 4/06* (2013.01); *B02C 4/38* (2013.01); *B02C 13/205* (2013.01); *B02C 19/22* (2013.01); *B02C 25/00* (2013.01)

(56) References Cited

U.S. PATENT DOCUMENTS 3,488,933 A 1/1970 Zimmermann
3,631,862 A * 1/1972 Rowland-Hill ..... A01F 12/28 460/109
3,982,549 A * 9/1976 De Pauw ..... A01F 12/20 460/71
4,375,221 A * 3/1983 Bernhardt ..... A01F 12/28 460/109
4,813,619 A * 3/1989 Tjumanok ..... B02C 13/205 241/188.1
5,059,134 A * 10/1991 Schauer ..... B60R 16/027 439/499
5,059,154 A * 10/1991 Reyenga ..... A01F 12/44 460/102
5,489,239 A * 2/1996 Matousek ..... A01F 12/28 460/109
6,251,009 B1 6/2001 Grywacheski et al.
7,322,175 B2 * 1/2008 Ferre ..... A01D 82/02 56/16.4 B
8,056,311 B1 * 11/2011 Barnett ..... A01D 82/00 56/16.4 B
8,152,610 B2 4/2012 Harrington
8,313,362 B2 11/2012 Roberge et al.
8,733,241 B2 5/2014 Roberge
10,004,176 B2 * 6/2018 Mayerle ..... A01F 12/40
2005/0277454 A1 12/2005 Couture
2009/0098266 A1 4/2009 Briz et al.
2011/0151950 A1 * 6/2011 Regier ..... A01F 12/181 460/69
2014/0018134 A1 * 1/2014 Farley ..... A01F 12/26 460/68
2014/0252141 A1 9/2014 Weinmann et al.
2015/0028139 A1 * 1/2015 Bihn ..... B02C 4/08 241/9
2015/0351322 A1 * 12/2015 Desmet ..... A01D 61/00 460/114
2015/0373913 A1 12/2015 Berry et al.

FOREIGN PATENT DOCUMENTS

DE 3320045 A1 12/1984
DE 3540493 C1 4/1987
DE 19547355 A1 7/1997
DE 10350123 B3 1/2005
DE 102012201334 A1 8/2013
WO 2008010854 A1 1/2008
WO 2013087423 A1 6/2013

* cited by examiner

SYSTEM AND METHOD FOR DESTROYING SEEDS IN CROP RESIDUE PRIOR TO DISCHARGE FROM AGRICULTURAL HARVESTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a Reissue Application of U.S. Pat. No. 10,314,232, issued Jun. 11, 2019.*

FIELD OF THE INVENTION

The present invention relates generally to residue handling systems in agricultural harvesters, and more particularly to a system and method for destroying seeds, such as weed seeds, in residual material separated from crops prior to discharging the residual material from the harvester.

BACKGROUND

Axially arranged rotary threshing or separating systems have long been in use in agricultural combines for threshing crops to separate grain from crop residue. These axially arranged systems typically include at least one cylindrical rotor rotated within a cage or concave, with the rotor and surrounding concave being oriented so as to extend forwardly to rearwardly within the combine.

During operation of the combine, crop material is fed or directed into a circumferential passage between the rotor and the concave. The crop material is carried rearwardly along a generally helical path through the passage by rotation of the rotor. As the crop material moves through the passage, grain is threshed from the crop material. Grain and chaff are separated out and drop into a cleaning system which separates the grain from the chaff. Stalks and other larger material that remain between the rotor and concave are discharged or expelled at a rear or downstream end of the rotor. Chaff that exits the cleaning system and crop residue that exits the threshing system are directed into a crop residue distribution system. The crop residue distribution system can include a rotary beater, chopper or other apparatus that conveys or chops the residue into smaller pieces and propels the crop residue rearwardly towards a distribution chamber or area at the rear end of the combine. Crop residue that enters the distribution chamber can either be discharged onto a field as a windrow, or directed into a spreader mounted on or at the rear end of the combine that is operable for spreading the residue over a swath of the field.

Crop residue that is discharged from conventional and axial combines onto fields often contains lost grain and seeds, including shrunken crop seeds and weed seeds. Most or all of the seeds are in the chaff that exits the cleaning system. Many of the seeds are not destroyed and remain viable after exiting the combine. Viable seeds can germinate and sprout in the field, resulting in the spread of undesired weeds and potential crop disease. Weeds that sprout are typically killed by tillage or chemical treatment. Weed control measures such as these can cost significant time and expense. Moreover, these weed control measures require additional equipment and additional equipment passes over the field. Additional equipment passes over the field can increase soil compaction and adversely impact the condition of the field.

Other weed control measures have included windrowing of chaff, followed by either burning or collecting the windrows before weeds can sprout. Weed control measures have also included pulling a large square baler behind the combine to contain seeds, or using an integrated continuous round baler. Examples of balers are described in U.S. Pat. Nos. 8,313,362 and 8,733,241, the contents of both patents being incorporated herein by reference in their entireties. These weed control measures also add significant time and expense, require additional equipment, and increase the number of equipment passes over the field. In addition, chaff has a low bulk density, making collection and transportation of the chaff material very inefficient.

To avoid discharging seeds into the field, some operators omit separation and cleaning steps during harvesting, and simply collect the grain and chaff together in the combine, without discharging the residue into the field. The combined grain and chaff (or "graff") is taken from the field to a stationary recleaner to separate grain seeds, weed seeds and chaff by winnowing. This approach removes weed seeds from the field but requires transportation of the chaff material, which, as noted above, is very inefficient due to the low bulk density of the chaff. Processing using a stationary recleaner also generates residual material that must be handled.

The foregoing drawbacks of conventional weed control methods illustrate the need for more efficient and cost effective solutions for controlling weeds that sprout from crop residue.

SUMMARY

The drawbacks of conventional weed control methods are addressed in many respects by systems and methods in accordance with the invention. Systems and methods in accordance with the invention are configured to damage seeds in crop residue before the crop residue exits the combine, thereby preventing seeds from germinating after they re-enter the field. By preventing unwanted sprouting of weeds, systems and methods in accordance with the invention avoid the time and expense of conventional weed control measures, such as the time and expense associated with crop tillage, chemical treatment, burning, chaff collection and transport. In addition, systems and methods in accordance with the invention are implemented during the harvesting operation, requiring no additional equipment or equipment passes over the field. As such, the undesired growth of weeds and crop plants are controlled without disrupting the normal harvesting operation, and without the need for any post-harvesting operations.

According to one embodiment of the invention, a system for processing seeds collected by an agricultural harvester includes at least one first shearing surface, at least one second shearing surface arranged opposite the at least one first shearing surface, and a clearance between the at least one first shearing surface and the at least one second shearing surface. The clearance is adapted to receive a flow of crop material containing seeds, and further adapted to convey said flow of crop material between the at least one first shearing surface and the at least one second shearing surface, such that said flow of crop material contacts the at least one first shearing surface and the at least one second shearing surface to damage seeds present in the crop material and prevent the seeds from germinating after exiting the system.

According to another embodiment, the at least one first shearing surface moves at a first tangential velocity relative to the system, and the at least one second shearing surface moves at a second tangential velocity relative to the system that is different from the first velocity.

According to another embodiment, the system includes at least one first cylindrical body and at least one second cylindrical body, wherein the at least one first shearing surface extends along a portion of the at least one first cylindrical body, and the second shearing surface extends along a portion of the at least one second cylindrical body.

According to another embodiment, the at least one first cylindrical body includes a first roller having a first shaft and a first helical thread winding around the first shaft.

According to another embodiment, the at least one second cylindrical body includes a second roller having a second shaft and a second helical thread winding around the second shaft.

According to another embodiment, the at least one first shearing surface includes a radially outwardly-facing edge on the first helical thread, and the at least one second shearing surface includes a radially outwardly-facing edge on the second shaft.

According to another embodiment, the first helical thread is mated with the second helical thread, such that the radially outwardly-facing edge on the first helical thread faces the radially outwardly-facing edge on the second shaft, the clearance being defined between the radially outwardly-facing edge on the first helical thread and the radially outwardly-facing edge on the second shaft.

According to another embodiment, the at least one first cylindrical body includes a plurality of first cylindrical bodies, and the at least one second cylindrical body includes a plurality of second cylindrical bodies.

According to another embodiment, the system includes at least one baffle positioned above the at least one first cylindrical body and the at least one second cylindrical body, the baffle positioned to direct crop material to an area between the at least one first cylindrical body and the at least one second cylindrical body.

According to another embodiment, the system includes at least one catch pan or crop gathering pan beneath the at least one first cylindrical roller and the at least one second cylindrical roller, the at least one catch pan or crop gathering pan adapted to catch crop material passing between the at least one first cylindrical roller and the at least one second cylindrical roller.

According to another embodiment, the system includes at least one frame for attaching the at least one first cylindrical body and the at least one second cylindrical body to an agricultural harvester.

According to another embodiment, the at least one first cylindrical body includes at least one first cylindrical roller that is fixed relative to the at least one frame, and the second cylindrical body includes at least one second cylindrical roller that is movable relative to the at least one frame.

According to another embodiment, the at least one second cylindrical roller is movable between a home position, in which the at least one second cylindrical roller is spaced a first distance from the at least one first cylindrical roller, and a deflected position, in which the at least one second cylindrical roller is spaced a second distance from the at least one first cylindrical roller, the second distance being greater than the first distance.

According to another embodiment, the system includes at least one biasing element that movably connects the at least one second cylindrical roller to the at least one frame, the at least one biasing element exerting a biasing force on the at least one second cylindrical roller to urge the at least one second cylindrical roller toward the home position.

According to another embodiment, the at least one first cylindrical body includes a first gearing operable to rotate the at least one first cylindrical body at a first velocity relative to the system, and the at least one second cylindrical body includes a second gearing operable to rotate the at least one second cylindrical body at a second velocity relative to the system that is different from the first velocity.

According to another embodiment, the at least one first cylindrical body includes at least one drum, and the at least one second cylindrical body includes at least one concave mounted around the at least one drum.

According to another embodiment, the at least one first shearing surface includes an outer surface on the at least one drum, the outer surface having a first plurality of projecting elements, and the at least one second shearing surface includes an inner surface inside the at least one concave, the inner surface having a second plurality of projecting elements that intermesh with the first plurality of projection elements on the at least one drum.

According to another embodiment, the system includes an adjustment system for adjusting a clearance between the at least one drum and the at least one concave, the adjustment system including a pivot hinge that pivotally connects the at least one concave to the at least one drum, and an adjusting screw rotatable to pivot the at least one concave relative to the at least one drum to change the clearance between the at least one drum and the least one concave.

According to another embodiment, the system is mounted on a pivot assembly configured to permit the system for processing seeds to fold downwardly and allow a flow of crop material to bypass the system for processing seeds.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION

Figure 1:
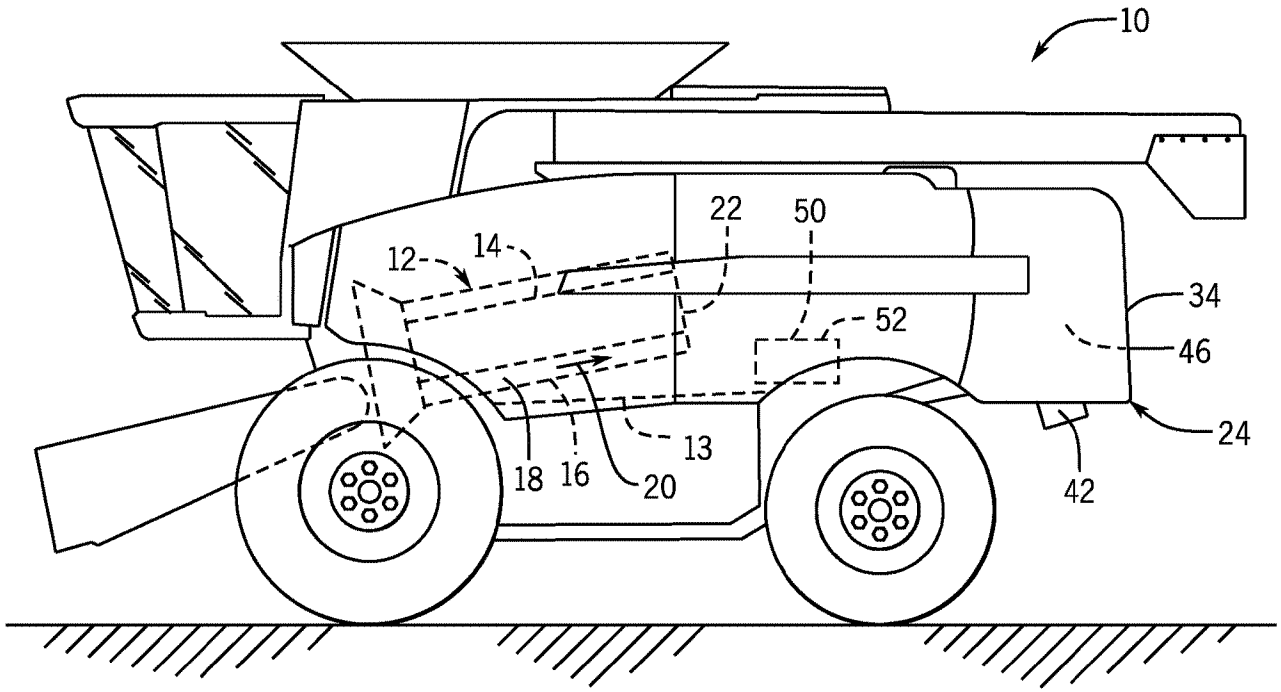
FIG. 1 is a side view of an agricultural combine that includes a seed processor system in accordance with an embodiment of the invention.

Reference now will be made in detail to embodiments of the invention, one or more examples of which are illustrated in the drawings. Each example is provided by way of explanation, but not limitation. In fact, it will be apparent to those skilled in the art that various modifications and variations can be made to the described embodiments without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, wherein exemplary embodiments of the present invention are shown, FIG. 1 illustrates a simplified, side view of one embodiment of an agricultural combine 10. In general, the combine 10 may be configured the same as or similar to any suitable agricultural combine known in the art, such as a conventional style combine or axial combine. For instance, as shown in FIG. 1, the combine 10 can include an axially arranged threshing system 12 and a cleaning system 13. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 34 of the combine 10 (indicated by arrow 20), the crop (e.g., grain, legumes, and/or the like) may be separated from the residue (e.g., husks, pods and/or the like) and drop into cleaning system 13. The crop residue may continue along the helical path and may be subsequently discharged through a discharge opening (not shown) defined at a downstream end 22 of the threshing system 12.

Combine 10 also includes a crop residue discharge system 24 for expelling crop residue from the combine to the field. Discharge systems used with combines in accordance with the invention can include a variety of mechanisms for discharging crop residue to the field. For example, discharge system 24 includes a spreader 42 for swath spreading. In addition, discharge system 24 includes an opening 46 near the rear of the combine for windrowing. An example of such a system is described in U.S. Pat. No. 9,107,349, also assigned to applicant, the contents of said patent being incorporated by reference herein in its entirety.

Combine 10 further includes a seed processor 50 located downstream of cleaning system 13. As will be explained, seed processors in accordance with the invention can take various forms. Therefore, FIG. 1 shows seed processor 50 in schematic form only, with the understanding that its appearance and relative position inside or outside of combine 10 will vary depending on the embodiment. Generally speaking, seed processor 50 is configured to receive crop residue from cleaning system 13 and destroy or damage seeds through shearing forces, so that when the seeds exit combine 10, the seeds are no longer viable and able to germinate. In this configuration, seed processor 50 provides an on-board destruction mechanism 52 inside the combine that destroys seeds, thereby preventing seeds present in crop residue from leaving the combine in a viable state.

Seed processors 50 in accordance with the invention preferably damage seeds by shear action. For example, a seed processor in accordance with the invention can include first and second surfaces facing one another and spaced closely together, forming a narrow passage between the surfaces. Seeds and finer pieces of crop residue can be passed through the narrow passage during processing, while directly or indirectly contacting both the first and second surfaces. As seeds are passed through the passage, the first and second surfaces move in the same general direction along the passage, but at different velocities, thereby introducing a shear effect that destroys the seeds as they pass through the first and second surfaces. By utilizing shear in this manner, seeds can be destroyed inside the combine without resorting to other systems that rely on crushing or impact to break up crop residue. Crushing can have significant power and force requirements, as well as low throughputs.

Figure 2:
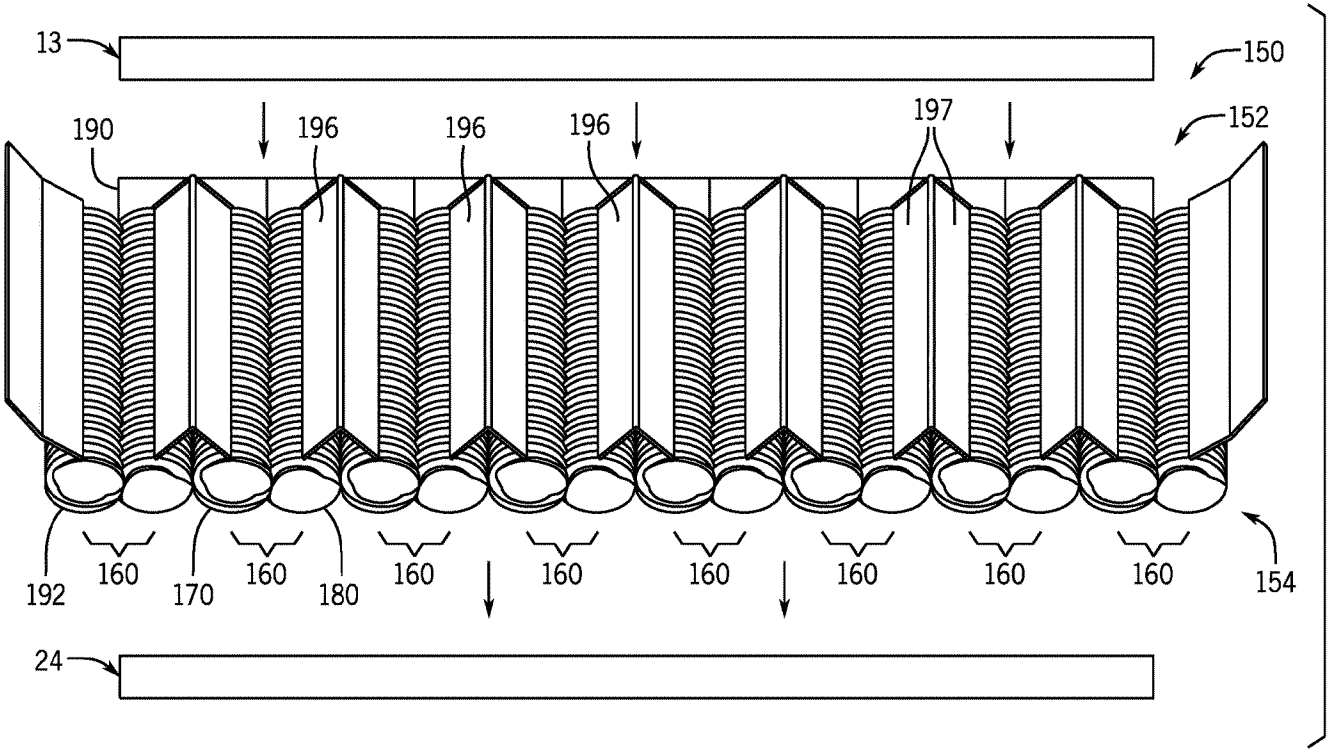
FIG. 2 is a schematic view of a seed processor system in accordance with an embodiment of the invention, the seed processor system shown in line with other components of an agricultural combine.

Referring to FIG. 2, one example of a seed processor 150 is shown in accordance with an exemplary embodiment. For purposes of description, seed processor 150 will be described in the manner in which would be installed in combine 10, with the understanding that the seed processor can be installed in different types of machinery and is not intended exclusively for combine 10. Seed processor 150 has a residue receiving end (or "upstream end") 152 that is oriented toward or facing cleaning system 13. Seed processor 150 also has a residue discharging end (or "downstream end") 154 located opposite upstream end 152 and oriented toward or facing distribution system 24. A plurality of roller pairs 160 are arranged in parallel to one another between upstream end 152 and downstream end 154.

Figure 3:
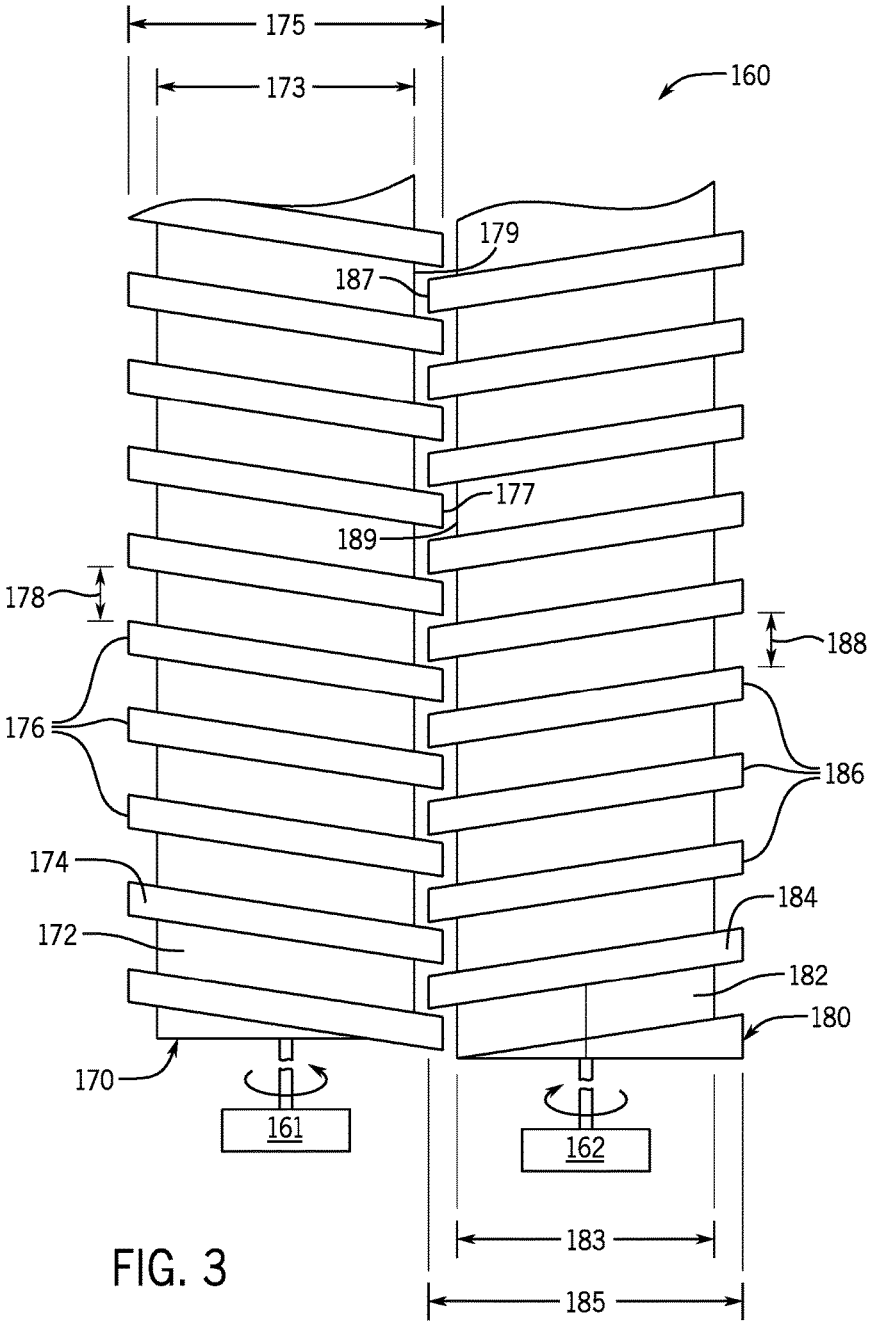
FIG. 3 is an enlarged and partially truncated plan view of components of the seed processor system of FIG. 2.

Referring to FIG. 3, each roller pair 160 includes a first roller 170 and a second roller 180. First roller 170 has a cylindrical body 172 and a left hand helical ridge or thread 174 extending around the body. Thread 174 defines a series of crests 176 along the length of first roller 170, with the spacing or "pitch" between adjacent crests being constant. A space or gap 178 is defined between adjacent crests 176. In a similar arrangement, second roller 180 has a cylindrical body 182 and a right hand helical ridge or thread 184 extending around the body. Thread 184 defines a series of crests 186 along the length of second roller 180, with the spacing or "pitch" between adjacent crests being constant. A space or gap 188 is defined between adjacent crests 186.

First roller 170 and second roller 180 of each roller pair 160 are juxtaposed in a mated arrangement. In this arrangement, thread 174 of first roller 170 is received in gap 188 of second roller 180, and thread 184 of the second roller is received in gap 178 of the first roller. Thread 174 defines a shearing surface 177 at its outer most portion that faces an opposing shearing surface 189 on body 182. Similarly, thread 184 defines a shearing surface 187 at its outer most portion that faces an opposing shearing surface 179 on body 172. In preferred embodiments, the roller pairs are all arranged with their respective threads mated in this fashion, such that each roller is mated with an adjacent roller on each side, with the exception of the two rollers one each end, as shown in FIG. 2. The distance between each crest 176 on first roller 170 and body 182 of second roller 180 is very small, as is the distance between each crest 186 on second roller 180 and body 172 of first roller. In this arrangement, the space between shearing surfaces 177 and 189, and the space between shearing surfaces 179 and 187 is very narrow. For example, the clearance between shearing surface 177 and shearing surface 189 can be between about 0.1 mm to about 0.5 mm, and the clearance between shearing surface 187 and shearing surface 179 can be between about 0.1 mm to about 0.5 mm.

Each first roller 170 is connected to a drive mechanism 161 that rotates each first roller in a first direction of rotation (e.g. clockwise). Similarly, each second roller 180 is connected to a drive mechanism 162 that rotates each second roller in a second direction of rotation opposite the first direction (e.g. counterclockwise). In preferred embodiments, the major diameter 175 of each first roller 170 (i.e. the diameter of the circular profile of thread 174) is significantly larger than the minor diameter 173 of the first roller (i.e. the diameter of body 172). Likewise, the major diameter 185 of each second roller 180 (i.e. the diameter of the circular profile of thread 184) is significantly larger than the minor diameter 183 of the first roller (i.e. the diameter of body 182). This differential in diameter creates a corresponding differential between the turning velocity of the opposing shearing surfaces when the rollers are driven at the same or similar speeds. In particular, the turning velocity of shearing surfaces 177 and 187 (along the outer diameters) are higher than the turning velocities of shearing surfaces 179 and 189 (along the inner diameters). These differentials create a shearing effect on seeds and other smaller materials that pass between first and second rollers 170 and 180.

Seed processor 150 further includes a catch plate 190 beneath the roller pairs 160. Catch plate 190 is spaced closely to the rollers with very tight clearance. For example, the clearance between catch plate 190 and each roller can be between about 0.1 mm to about 0.5 mm. Other clearances can also be suitable, and the selection can depend on factors such as, but not limited to, the desired throughput and/or the physical nature of crop residue. Catch plate 190 includes a series of concave sections 192, each concave section aligned with a roller immediately above the concave section as shown in FIG. 2.

In preferred embodiments, the seed processor receives crop residue material in a top loading fashion, where material is dropped onto the rollers at or near the upstream end. In addition, the seed processor preferably has one or more guides that direct the flow of crop residue material to areas between adjacent rollers. In seed processor 150, for example, a series of inverted V-shaped baffles or ramps 196 are incrementally arranged above roller pairs 160 and extend in a longitudinal direction between the upstream end 152 and downstream end 154. Each baffle 196 has a pair of downwardly sloped surfaces 197 oriented at angles relative to the axis of the corresponding rollers. The downwardly sloping surfaces 197 are oriented toward spaces between adjacent rollers as shown. In this arrangement, adjacent baffles 196 funnel the crop material toward the spaces between adjacent rollers where the threads mate with one another.

The manner of operation of seed processor 150 will now be described in more detail. Drive mechanisms 161 and 162 are activated to rotate the first rollers 170 and second rollers 180 in opposite directions of rotation. Crop material is fed through threshing system 12 to separate grain from crop residue in any conventional manner. Chaff and grain drops from threshing system 12 and enters cleaning system 13. Chaff that is discharged from cleaning system 13 is conveyed to upstream end 152 of seed processor 150, where the material is dropped onto the seed processor by gravity. Crop residue falls by gravity and initially lands on the baffles 196. The inverted V-shape of each baffle directs material to either side of the baffle as the material continues to fall by gravity. Adjacent baffles 196 create a funneling effect or chute that directs the falling material toward the narrow areas between each roller pair 160 where the roller threads mate. After the crop residue lands on top of the first and second rollers 170 and 180, the residue is separated based on size, with larger sized material remaining on top of the rollers, and smaller sized material passing into the narrow spaces between threads 174 and 184.

Material remaining on top of the rollers is carried by the rotating helical threads 174 and 184 toward discharge end 154 of seed processor 150. Larger material that reaches discharge end 154 can then be dropped onto or otherwise conveyed to residue discharge system 24 of combine 10.

Seeds and other smaller materials that pass into the narrow spaces between rollers 170 and 180 become caught between opposing shearing surfaces. Some of the seeds and smaller material become trapped between shearing surfaces 177 and 189, while other seeds and small material become trapped between shearing surfaces 179 and 187. In preferred embodiments, rollers 170 and 180 rotate at the same or substantially similar speeds. A number of variables can influence the chosen speed of rotation, including but not limited to the diameter of the rollers 170 and 180. For example, rollers 170 and 180 having a diameter of 100 mm can be operated at a speed of between about 100 rpm and about 500 rpm, and more preferably between about 100 rpm and about 200 rpm. The resulting differential in turning velocity between the opposing shearing surfaces imparts a shearing effect that destroys the seeds as they pass through rollers 170 and 180. The destroyed seeds and other processed residue descend downwardly through rollers 170 and 180 and fall by gravity onto the catch plate 190, where the material is trapped in the small gap between the catch plate and threads 174 and 184. Seeds and smaller material trapped on catch plate 190 are conveyed toward discharge end 154 by the rotating threads 144 and 184, similar to the larger material that remains on top of the rollers. The destroyed seeds and smaller material that reaches discharge end 154 can then be dropped onto or otherwise conveyed to residue discharge system 24 of combine 10.

Counter-rotating helical rollers in accordance with the invention provide numerous advantages over other types of processors. The helical rollers damage and destroy seeds primarily by shearing. By utilizing shear forces as the primary mechanism for damaging seeds, the rollers only need to be constructed to withstand the relatively small stresses and loads associated with shearing or pinching seeds and smaller material. The rollers do not have to crush or break up rocks and other bulky material in the crop residue. Crushing and breaking up larger material requires very rigid components that are capable of exerting and withstanding significant forces for crushing the larger material. The sizes and turning velocities of crushing components must also be relatively high, resulting in larger power requirements. In contrast, the power requirement for seed processors in accordance with the invention can be much lower, as crushing of larger material is not required.

The helical geometry of the rollers, combined with the counter-rotation, also provides a dual-conveyance system that efficiently moves residue through the combine. In particular, the helical threads simultaneously move both large debris and smaller debris from the cleaning system to the discharge system. Throughput of material can be maintained at higher speeds compared to systems that crush material, because larger debris is simply passed through the system over the rollers.

Seed processors in accordance the invention can include various roller dimensions. For example, each roller can have a length of between about 400 mm to about 600 mm, and a major diameter of between about 50 mm to about 150 mm. More specifically, each roller can have a length of about 500 mm and a major diameter of about 100 mm. Other dimensions within or outside the stated ranges can also be used with suitable results in accordance with the invention.

The thread thickness, pitch and helical angle of each roller can be customized to accommodate different operational requirements. Non-helical rollers can also be used in accordance with the invention, such that the rotating threads are substantially normal to the axis of the rollers. Larger and smaller materials that are processed by non-helical rollers can be conveyed by inclining the system and using air, belts, gravity, combinations thereof, and/or other mechanisms to move the material through the processor.

Figure 4:
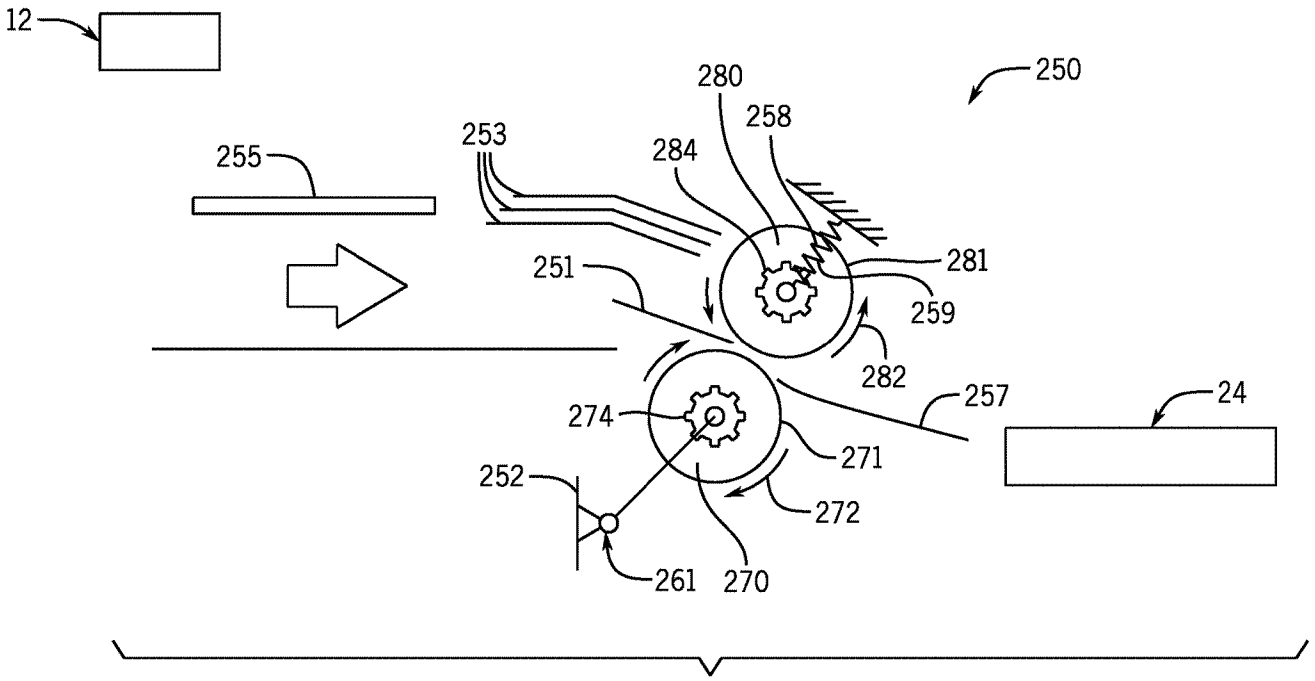
FIG. 4 is a schematic elevation view of a seed processor system in accordance with an embodiment of the invention, the seed processor system shown in an operative mode with other components of an agricultural combine.

Shearing of seeds can be carried out in accordance with the invention by creating a speed differential between opposing surfaces, including but not limited shearing surfaces on the exterior of counter-rotating rollers. In some instances, it may be desirable to use counter-rotating rollers without any threads or other discontinuities, and rely solely on a speed differential between opposing surfaces. FIG. 4 shows one such example of an alternative seed processor 250 in accordance with the invention. Seed processor 250 receives crop residue that is discharged from a cleaning system, such as cleaning system 13 on combine 10. Before crop residue passes through seed processor 250, the crop residue passes through the thresher system, which separates smaller residual material from larger residual material. The larger material can be conveyed to a chopper and thrown onto a spreader or other residue discharge system on the back of the vehicle. The smaller material from the thresher passes to the cleaning system 13 and then to seed processor 250.

Seed processor 250 features two non-threaded rollers for damaging and destroying seeds contained in the smaller residue leaving the cleaning system. In particular, seed processor 250 includes a first or lower roller 270 and second or upper roller 280. Lower roller 270 and upper roller 280 are shown mounted to a frame 252. Frame 252 can be mounted to the interior of a combine in the same general location that a straw hood would be located.

Lower roller 270 and upper roller 280 are counter-rotating rollers, i.e. rollers that rotate in opposite directions. With respect to FIG. 4, lower roller 270 rotates in a clockwise direction 272 with respect to the Figure, and upper roller 280 rotates in a counter-clockwise direction 282 with respect to the Figure, as shown by the respective arrows. Lower roller 270 and upper roller 280 are individually mounted with a small space or gap 251 between them. Gap 251 is sufficiently small to allow seeds and smaller material to contact lower roller 270 and upper roller 280 as they pass through seed processor 250. Lower roller 270 has a lower shearing surface 271, and upper roller 280 has an upper shearing surface 281 separated from the lower shearing surface by gap 251. As will be explained, seeds that pass between lower roller 270 and upper roller 280 are gripped by lower shearing surface 271 and upper shearing surface 281 to impart shear stresses to the seeds and destroy the seeds before they exit the combine.

Lower roller 270 and upper roller 280 can be hydraulically driven or mechanically driven with a pulley and belt. Lower roller 270 is connected to a first gearing 274, and upper roller 280 is connected to a second gearing 284. First gearing 274 is configured to transmit torque to lower roller 270 so as to rotate the lower roller and lower shearing surface 271 at a first speed. Second gearing 284 is configured to transmit torque to upper roller 280 so as to rotate the upper roller and upper shearing surface 281 at a second speed that is different from the first speed. The speed differential between lower shearing surface 271 and upper shearing surface 281 causes shear stresses to develop in the crop flow that destroy the seeds before they exit the combine.

Lower roller 270 and upper roller 280 can operate at various speeds, depending in part on the type and nature of material passing through the rollers, the desired throughput, and the diameters of the rollers. For example, lower roller 270 can operate at a speed of about 2,000 rpm, and upper roller 280 can operate at a slightly faster speed of about 2,100 rpm, creating a speed differential that imparts shear stresses that destroy seeds in the material. A typical speed differential for imparting shear stresses that destroy seeds is between approximately 5% and approximately 20%. However, speed differentials below this range as well as speed differentials above this range can also provide suitable shear stresses to destroy seeds.

Seed processors in accordance with the invention that utilize rollers can include an adjustment mechanism to account for fluctuations in the size or mass of material passing through rollers. An adjustment mechanism can be desirable to reduce the potential for crop material backing up or clogging the seed processor. In the present example, lower roller 270 is a stationary roller that remains in a fixed position relative to frame 252 during operation. Upper roller 280 is a displaceable or adjustable roller that can change position relative to frame 252 during operation. The position of upper roller 280 adjusts automatically in response to changes in the size or mass of the crop flow entering between the rollers, so as to prevent material from clogging the seed processor 250. An increase in the size or mass of material passing through lower roller 270 and upper roller 280 will exert an outwardly directed force on both rollers, like a wedge. Upper roller 280 is displaced or deflected outwardly and away from lower roller 270 in response to this outward force. Lower roller 270 remains fixed in position relative to frame 252, as noted earlier.

Upper roller 280 is displaceable between a home position and a deflected position in response to changes in size or mass of material passing through the rollers. In the home position, upper roller 280 is at a position closest to lower roller 270, such that gap 251 is at a minimum width. In a deflected position, upper roller 280 is moved outwardly and away from the home position, which increases the width of gap 251. A biasing mechanism 258 exerts a biasing force on upper roller 280 to urge the upper roller toward the home position. A variety of biasing mechanisms can be used to bias the upper roller toward the home position. In the present example, biasing mechanism 258 includes a compression spring 259 which is in a relaxed state when upper roller 280 is in the home position. When upper roller 280 is deflected away from the home position, for example in response to an increased size of material passing between the rollers, the outward force on the upper roller is transferred to compression spring 259. Compression spring 259 is compressed under stored energy and remains compressed until the outward force on upper roller 280 is released. Once outward force on upper roller 280 is released, the stored energy in compression spring 259 expands the spring to return the upper roller to the home position.

Seed processors in accordance with the invention can include one or more flow control mechanisms to prevent too much material from entering the seed processor at one time and possibly choking the system. In the present example, seed processor 250 includes a series of fingers 253 mounted above the flow and just upstream or proximal to lower roller 270 and upper roller 280. Fingers 253 can take one of many structural forms, including but not limited to rods, grates, tines or other elongated members. Each finger 253 descends downwardly toward the crop flow and causes the crop material to deflect or converge so that the material is guided toward the space between the lower roller 270 and upper roller 280. As such, fingers 253 channel the crop residue and cause it to merge through the lower roller 270 and upper roller 280. Seed processor 250 can also include an optional sieve 255 at the upstream end of the seed processor. Sieve 255 separates weed material from chaff, allowing the weed material and any seeds to pass through the sieve and enter lower roller 270 and upper roller 280. The chaff is diverted directly to the residue discharge system. Sieve 255 reduces the amount of material fed between lower roller 270 and upper roller 280, reducing the amount of material that is processed and increasing throughput. After the crop residue passes through lower roller 270 and upper roller 280, seeds in the residue are destroyed by shear forces. Residue that exits the rollers is compressed into a thin flat layer. The flat layer of material is conveyed by an adjustable pan 257 that delivers the material to residue discharge system 24 with the aid of gravity.

Figure 5:
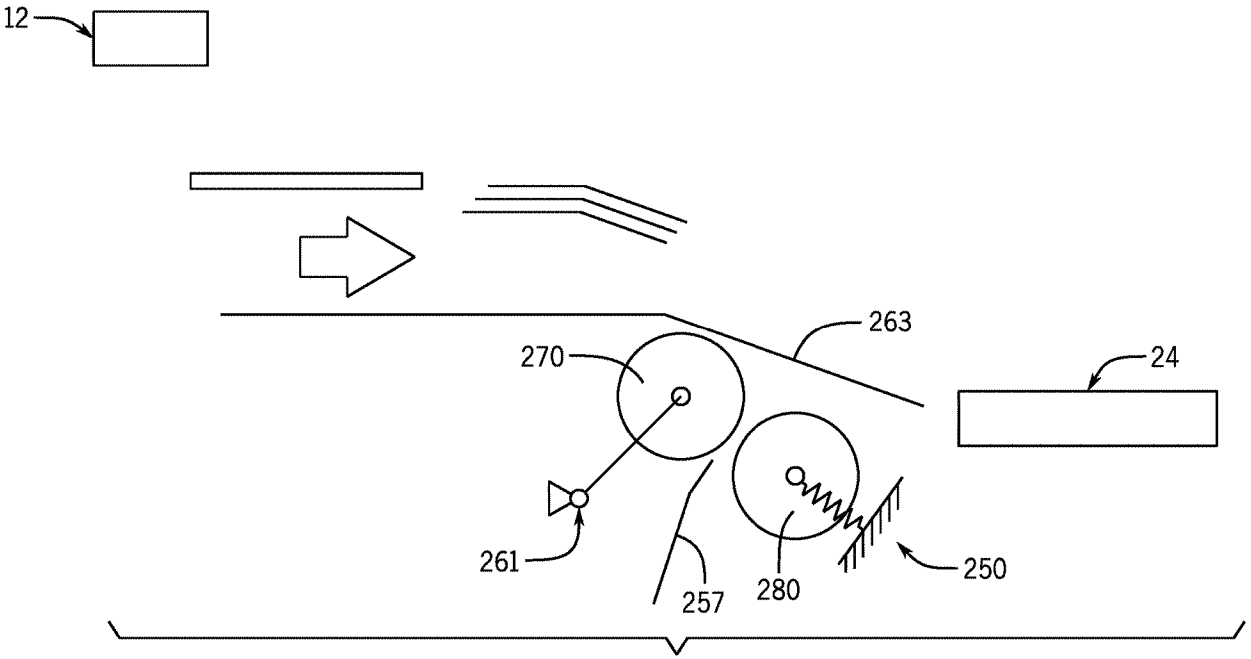
FIG. 5 is a schematic elevation view of the seed processor system of FIG. 4, the seed processor system shown in a bypass mode.

In some instances, the seed processor may not be required during a harvesting operation. Therefore, seed processors in accordance with the invention can be designed as optional accessories that can be selectively engaged and disengaged. For example, seed processors in accordance with the invention can be mounted on a movable mounting assembly that allows the seed processor to be moved into the path of crop residue when seed processing is required, and moved out of the path of crop residue when seed processing is not desired. Referring to FIG. 5, seed processor 250 is mounted on a pivot assembly 261. Pivot assembly 261 is configured to permit seed processor 250 to fold downwardly and out of the path between the cleaning system and residue discharge system. Once folded down, seed processor 250 can be locked in the folded position where it remains in a stowed or inoperable condition. A top pan 263 can be installed in the place of seed processor 250 to connect the cleaning system with the residue discharge system so that the combine runs without the seed processor.

Figure 6:
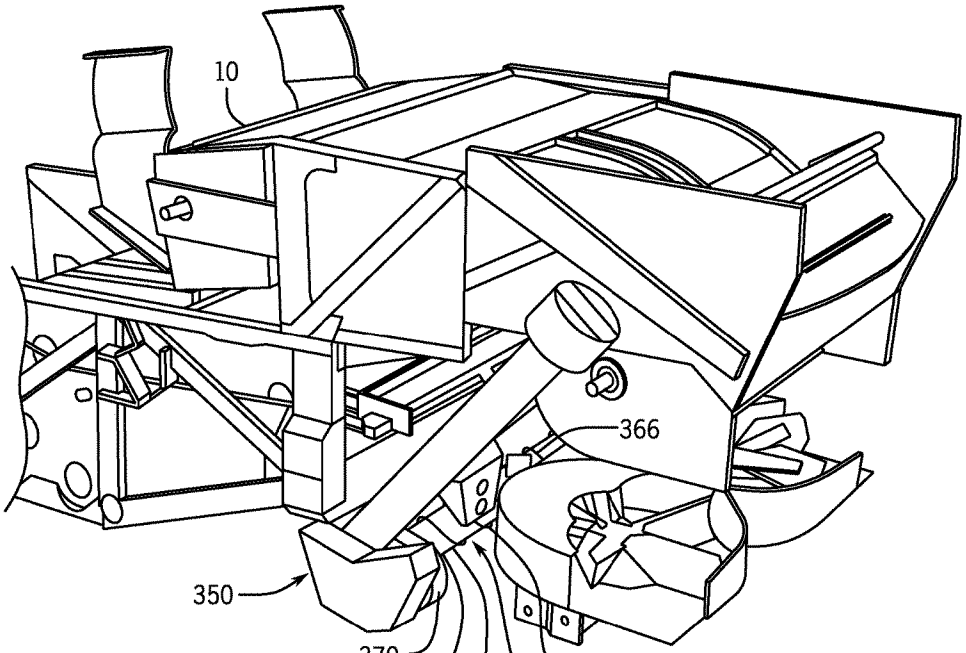
FIG. 6 is a partially truncated perspective view of a seed processor system in accordance with an embodiment of the invention, the seed processor system shown in line with other components of an agricultural combine.
Figure 7:
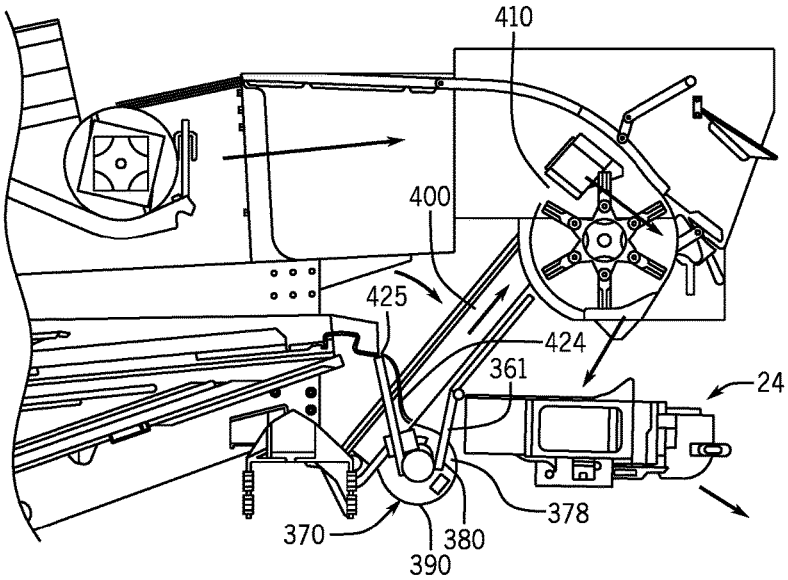
FIG. 7 is a partially truncated elevation view of the seed processor system of FIG. 6, showing the seed processor system in an operative mode.

Referring now to FIGS. 6 and 7, a seed processor 350 is shown in accordance with another exemplary embodiment. As noted earlier, seed processors in accordance with the invention can be utilized on various types of combines, including conventional combines and axial combines. Seed processor 350, which is installed on a rear section of an agricultural harvester, such as combine 10, includes a cross conveyor 360 that receives crop residue from a cleaning system. Chaff and smaller materials from cleaning system can drop onto cross conveyor 360 by gravity, or through other channels. Cross conveyors in accordance with the invention are configured to move smaller materials from cleaning system to one or both sides of the combine 10 for processing. As such, cross conveyors in accordance with the invention can include various mechanisms for moving material, including but not limited to augers and pneumatic systems. In the present example, cross conveyor 360 is in the form of an auger conveyor 362 that extends transversely to the longitudinal axis of combine 10 (i.e. an axis extending from the front of the vehicle to the rear of the vehicle parallel to the direction forward movement). Auger conveyor 362 includes a shaft with a first helical thread 364 on one side of the shaft and a second helical thread 366 on the other side of the shaft that appears as a mirror image or reverse configuration of the first helical thread. That is, first helical thread 364 winds in a first direction and angle, and second helical thread 366 winds in a second direction opposite the first direction. The first and second helical threads 364, 366 are oriented in opposing directions so that the threads catch smaller material that falls from the cleaning system and carry that material to opposite ends 365 of shaft 364, and toward the outer sides of combine 10, while the auger conveyor rotates.

Figure 8:
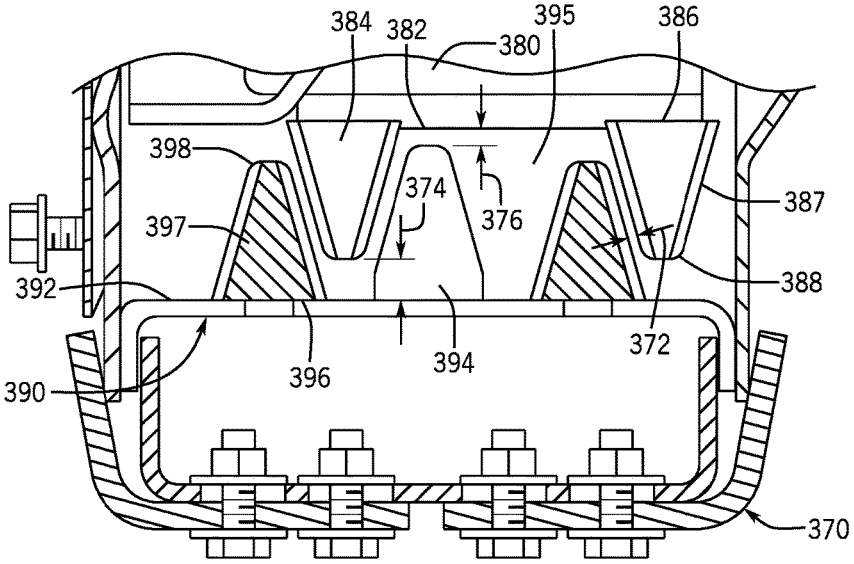
FIG. 8 is an enlarged and partially truncated cross sectional view of components of the seed processor system of FIG. 6.

Each end 365 of auger conveyor 362 discharges material to a processor housing 370 mounted to each side, or in proximity of each side, of combine 10. Referring to FIG. 8, processor housing 370 includes a drum 380 rotatably mounted inside a fixed concave wrapper or "concave" 390. Drum 380 has an outer surface 382 that includes a plurality of projecting elements 384 projecting radially outwardly from the outer surface. Concave 390 has an inner surface 392 that includes a plurality of projecting elements 394 projecting radially inwardly from the inner surface. Projecting elements 394 are incrementally spaced relative to one another on inner surface 392 to form channels or passages 395 therebetween. Passages 395 are arranged along inner surface 392 so as to radially and axially align with projecting elements 384 on drum 380 when the drum is mounted inside concave 390. The dimensions of passages 395 are adapted to allow projecting elements 394 to pass between projecting elements 384 as drum 380 rotates inside concave 390. As such, projecting elements 384 intermesh with projecting elements 394 as drum 380 rotates relative to concave 390.

Although the components of seed processor 350 direct material outwardly toward the sides of combine 10 for processing, it will be understood that other arrangements are also possible without departing from the invention. For example, an auger conveyor or other conveying mechanism could receive material from cleaning system 13 and convey the material inwardly toward the center of combine 10 for processing. Processing of material at the center of combine 10 could take place in one or more processor housings similar to processor housings 370. The processed material could then be conveyed from the processor housing(s) to the residue discharge system by a conveyor system. The conveyor system could be any type of bulk material handling system, including but not limited to an inclined auger as previously described, pneumatic conveyor, drag chain or bucket elevator.

Each projecting element 384 has a relatively wide base end 386, a relatively narrow free end 388, and sidewalls 387 that connect the base end to the free end. Sidewalls 387 taper and converge toward one another as the sidewalls extend toward free end 388. In a similar arrangement, each projecting element 394 has a relatively wide base end 396, a relatively narrow free end 398, and sidewalls 397 that connect the base end to the free end. Sidewalls 397 taper and converge toward one another as the sidewalls extend toward free end 398. As such, each projecting element 384 and 394 has a generally trapezoidal or triangular shaped profile as shown. The clearances between projecting elements 384 and rojecting elements 394 are very small so as to be less than the diameter of seeds encountered in the crop residue. The tight clearances allow the opposing surfaces of the projecting elements to impart shear stresses to seeds passing through seed processor 350 as drum 380 rotates in concave 390. For example, a first clearance 372 between opposing sidewalls 387 and 397 can be between about 0.5 mm to about 1.0 mm. A second clearance 374 between free ends 388 and inner surface 392 of concave 390 can also be between about 0.5 mm and about 1.0 mm. A third clearance 376 between free ends 398 and outer surface 382 of drum 380 can also be between about 0.5 mm and about 1.0 mm.

As drum 380 rotates in the fixed concave 390, seeds are damaged and destroyed by shear forces imparted to the seeds from the opposing surfaces between the drum and concave, and their respective projections. Referring again to FIG. 6, material is propelled toward the outside or outward facing end 378 of each processor housing 370 where it exits into an inclined auger 400. Each inclined auger 400 receives processed material from each processor housing 370 and conveys the material upwardly and rearwardly to a discharge head or trough 410. Processed seeds and other residue either fall by gravity into the field from discharge trough 410, or fall into residue discharge system 24 for dispersion into the field.

Figure 11:
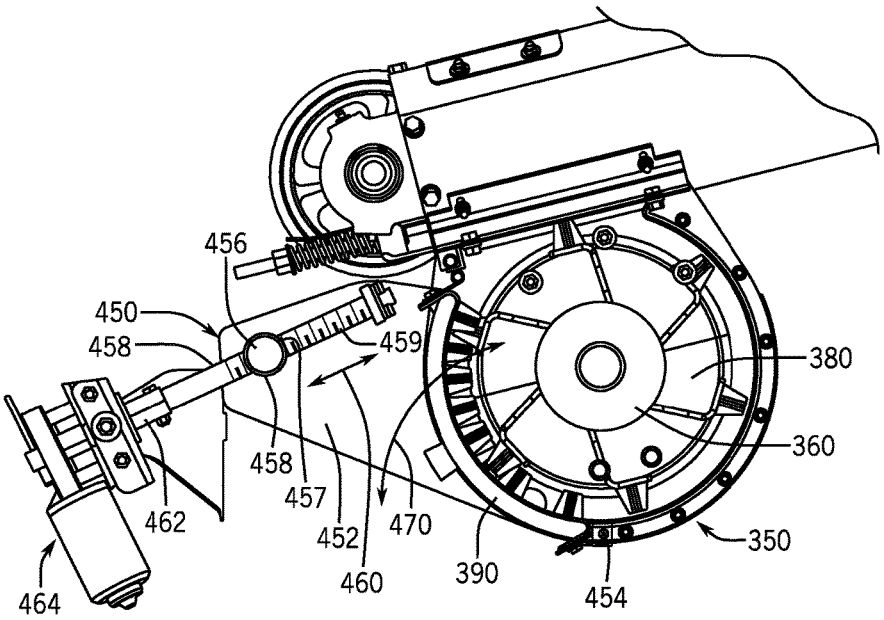
FIG. 11 is a side elevation view of the seed processor system of FIG. 6, showing the seed processor with an optional adjustment system.
Figure 12:
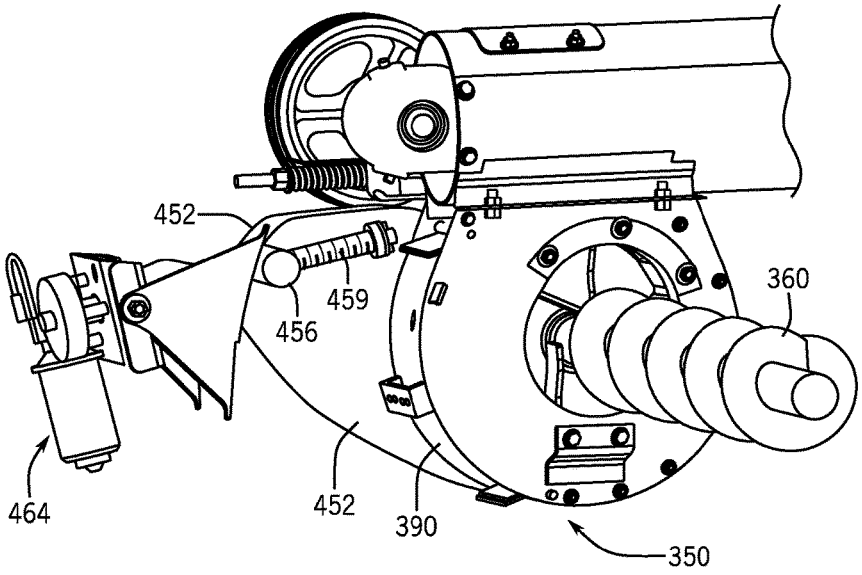
FIG. 12 is a perspective view of the seed processor system and optional adjustment system of FIG. 11.

Referring to FIGS. 11 and 12, seed processor 350 can include an adjustment system 450 that allows fine adjustment to clearances between drum 380 and concave 390 so that clearances are precisely controlled. Finer adjustment allows the operator to achieve a better balance between effecting enough shear stresses in the crop material to damage seeds, and providing an acceptable processing rate. In the present example, adjustment system 450 includes a pivoting arrangement between concave 390 and drum 380. A pair of plates 452 (only one of which is shown in FIG. 11) are welded, bolted or otherwise connected to each side of concave 390. Concave 390 and plates 452 are mounted on a pivot hinge 454 that allows the concave and plates to pivot in unison relative to drum 380. An adjustment nut 456 extends through a pair of openings 458 in each of plates 452. Adjustment nut 456 is displaceable in a direction 460 along a fine thread adjusting screw 458. Adjusting screw 458 features an external thread 459 that engages an internal thread 457 inside adjustment nut 456. Adjusting screw 458 extends normal to the drum axis and carries adjustment nut 456. One end of adjusting screw 458 is connected to a hub 462, which in turn is connected to an electric motor 464. Electric motor 464 is operable to rotate hub 462 and adjusting screw 458. When adjusting screw 458 rotates, adjustment nut 456 moves axially toward or away from drum 380 in direction 460. As adjustment nut 456 moves along direction 460, the ends of the adjustment nut transfer force to plates 452, causing the plates and concave 390 to pivot about pivot hinge 454 in the direction 470. As concave 390 pivots toward drum 380, the clearance between the drum and concave decreases. As concave 390 pivots away from drum 380, the clearance between the drum and concave increases. Thread 459 is configured such that adjustment nut 456 moves a very small distance in response to one revolution of adjusting screw 458, resulting in a very fine pivot motion of plates 452 and concave 390. In this arrangement, electric motor 464 and adjustment nut 456 are operable to pivot or tilt concave 390 toward drum 380 or away from the drum, depending on the direction of rotation of adjusting screw 458, to finely adjust the clearance between the drum and concave.

The clearance between drum 380 and concave 390 can be precisely adjusted to correspond to particular seed sizes and the extent of weed infestation. If the weed infestation is low or not a concern, for example, then the clearances can be increased to increase throughput capacity. If weed infestation is high, then the clearances can be decreased to maximize seed damage as material is passed through the seed processor 350. Seed processor 350 can operate at a different throughput rate than cross conveyor 360. The throughput rate of seed processor 350 can be increased to support the high capacity of the machine and also to increase the rate of seed damage.

Figure 9:
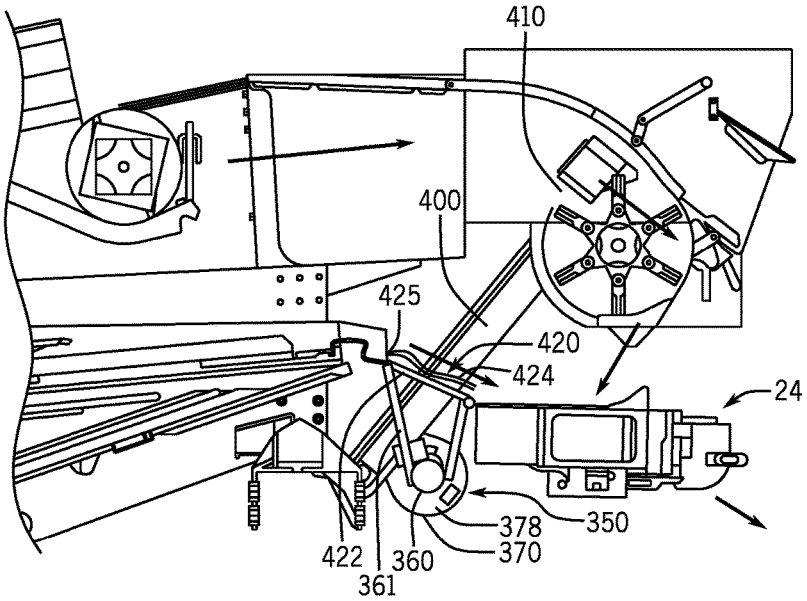
FIG. 9 is a partially truncated elevation view of the seed processor system of FIG. 6, showing the seed processor system in a bypass mode.

As with other embodiments, seed processor 350 can be equipped with a bypass mechanism 420 that allows the seed processor to be bypassed when seed damage is either not required or not a concern. Bypass mechanism 420, shown in FIG. 9, can include a deflector pan 422 that pivots to a downward position in which the deflector pan covers cross conveyor 360 and cross conveyor trough 361. When deflector pan 422 covers cross conveyor trough 361, chaff is directly conveyed to residue discharge system 24 and bypasses seed processor 350. Deflector pans in accordance with the invention are stationary when covering the cross conveyors. Therefore, it is sometimes desirable to include a movable agitator that ensures that chaff and other material continues to move past the deflector pan. Referring to FIGS. 7 and 9, for example, a rubber curtain or mat 424 is attached to an oscillating shoe 425 in front of cross conveyor trough 361. When deflector pan 422 is closed, rubber mat 424 covers the deflector pan and oscillates, creating a moving surface on top of the deflector pan that keeps material moving over the deflector pan and on to the discharge system. When deflector pan 422 is raised to allow entry of material into cross conveyor 360, rubber mat 424 will hang into the trough opening, but not touch the cross conveyor 360.

Rollers, drums, concaves, projections and other components that process seeds in accordance with the invention can be constructed of any suitable material that is ordinarily used in the manufacture of combine parts, including but not limited to steel or aluminum. In addition, components that process seeds in accordance with the invention can be provided with a coating for wear resistance. Moreover, components that process seeds in accordance with the invention can be provided with surface finishes to enhance the processing of crop residue, and more specifically, to enhance the shear effect on seeds passing through the processor. For example, surfaces on each component can have a surface roughness adapted to grip individual seeds and impart shear forces. In addition, or in the alternative, surfaces on each component can have a wear coating containing small particles with sharp edges, such as carbide particles or other surface elements. The sharp edges can enhance processing by contacting each seed and damaging each seed coat to prevent the seed from germinating. Furthermore, the surfaces of rollers in accordance with the invention can have various geometric protuberances that project outwardly from the rollers, such as spikes, teeth, barbs or other projections. Such projections can have a number of geometries including triangular, trapezoidal or other polygonal shapes. Moreover, roller surfaces in accordance with the invention can include various groove configurations, such as surfaces used on Shredlage® brand processors.

Figure 10:
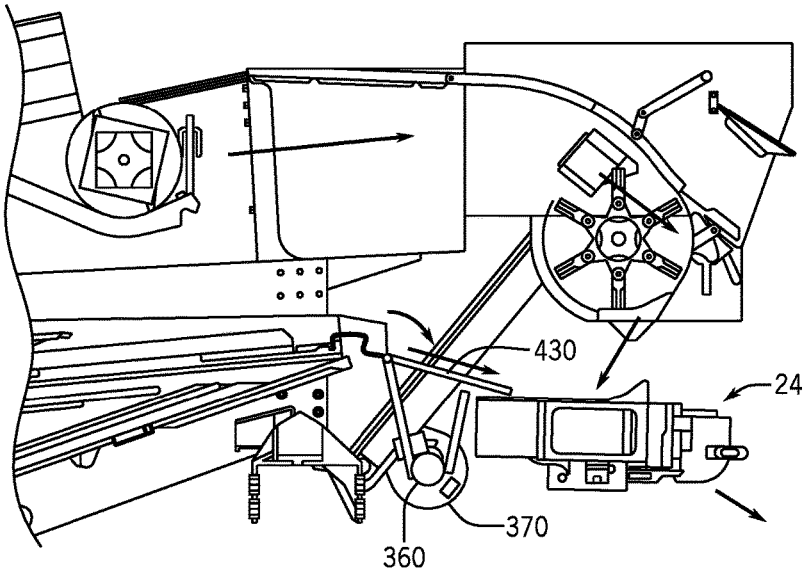
FIG. 10 is a partially truncated elevation view of the seed processor system of FIG. 6, showing the seed processor system with an optional mechanical separator.

Seed processors in accordance with the invention can include one or more "pre-processors" that process material prior to entering the seed processor. For example, a chopping device can be utilized upstream of the seed processor to reduce the size of materials about to enter the seed processor so that the materials can be processed more easily. In addition, or in the alternative, seed processors in accordance with the invention can include a metal detector or solid object detector to prevent entry of such objects into the seed processor. Seed processors in accordance with the invention can also include various types of mechanical separators to prevent larger objects from entering the processor. For example, a seed processor can include an oscillating screen 430 laid over an entry trough, such as the entrance of cross conveyor 360 shown in FIG. 10, to only allow small material like chaff and weed seeds to pass into the seed processor. The screen would convey the other objects directly to the residue distribution system.

What is claimed is:

1. A system for processing seeds that are present in crop material collected by an agricultural harvester, the system comprising at least one first shearing surface, at least one second shearing surface arranged opposite the at least one first shearing surface, and a clearance between the at least one first shearing surface and the at least one second shearing surface, the clearance adapted to receive a flow of crop material containing seeds, and further adapted to convey said flow of crop material between the at least one first shearing surface and the at least one second shearing surface, such that said flow of crop material contacts the at least one first shearing surface and the at least one second shearing surface to damage seeds present in the crop material and prevent the seeds from germinating after exiting the system, the system further comprising at least one first cylindrical body and at least one second cylindrical body, the at least one first shearing surface extending along a portion of the at least one first cylindrical body, and the second shearing surface extends along a portion of the at least one second cylindrical body, the at least one first cylindrical body comprising at least one drum, and the at least one second cylindrical body comprising at least one concave mounted around the at least one drum, the at least one first shearing surface comprising an outer surface on the at least one drum, the outer surface having a first plurality of projecting elements, and the at least one second shearing surface comprising an inner surface inside the at least one concave, the inner surface having a second plurality of projecting elements that intermesh with the first plurality of projection elements on the at least one drum.

2. The system for processing seeds according to claim 1, wherein the at least one first shearing surface moves at a first tangential velocity relative to the system, and the at least one second shearing surface moves at a second tangential velocity relative to the system that is different from the first tangential velocity.

3. The system for processing seeds according to claim 1, wherein the at least one drum is fixed relative to [the] at least one frame, and the at least one concave is movable relative to the at least one frame.

4. The system for processing seeds according to claim 3, wherein the at least one concave is movable between a first position, in which the at least one concave is spaced a first distance from the at least one drum, and a second position, in which the at least one concave is spaced a second distance from the at least one drum, the second distance being greater than the first distance.

5. The system for processing seeds according to claim 1 comprising an adjustment system for adjusting a clearance between the at least one drum and the at least one concave, the adjustment system comprising a pivot hinge that pivotally connects the at least one concave to the at least one drum, and an adjusting screw rotatable to pivot the at least one concave relative to the at least one drum to change said clearance between the at least one drum and the least one concave.

6. The system for processing seeds according to claim 5, wherein the system is mounted on a pivot assembly configured to permit the system for processing seeds to fold downwardly and allow a flow of crop material to bypass the system for processing seeds.

7. A system for processing seeds that are present in crop material collected by an agricultural harvester, the system comprising at least one first shearing surface, at least one second shearing surface arranged opposite the at least one first shearing surface, and a clearance between the at least one first shearing surface and the at least one second shearing surface, the clearance adapted to receive a flow of crop material containing seeds, and further adapted to convey said flow of crop material between the at least one first shearing surface and the at least one second shearing surface, such that said flow of crop material contacts the at least one first shearing surface and the at least one second shearing surface to damage seeds present in the crop material and prevent the seeds from germinating after exiting the system, the system further comprising at least one first cylindrical body and at least one second cylindrical body, wherein the at least one first shearing surface extends along a portion of the at least one first cylindrical body, and the second shearing surface extends along a portion of the at least one second cylindrical body, wherein the at least one first cylindrical body comprises a first roller having a first shaft and a first helical thread winding around the first shaft.

8. The system for processing seeds according to claim 7, wherein the at least one second cylindrical body comprises a second roller having a second shaft and a second helical thread winding around the second shaft.

9. The system for processing seeds according to claim 7, wherein the at least one first cylindrical body comprises a plurality of first cylindrical bodies, and the at least one second cylindrical body comprises a plurality of second cylindrical bodies.

10. The system for processing seeds according to claim 7 comprising at least one baffle positioned above the at least one first cylindrical body and the at least one second cylindrical body, the baffle positioned to direct crop material to an area between the at least one first cylindrical body and the at least one second cylindrical body.

11. The system for processing seeds according to claim 7 comprising at least one catch pan beneath the at least one first cylindrical roller and the at least one second cylindrical roller, the at least one catch pan adapted to catch crop material passing between the at least one first cylindrical roller and the at least one second cylindrical roller.

12. The system for processing seeds according to claim 7 comprising at least one frame for attaching the at least one first cylindrical body and the at least one second cylindrical body to the agricultural harvester.

13. The system for processing seeds according to claim 8, wherein the at least one first shearing surface comprises a radially outwardly-facing edge on the first helical thread, and the at least one second shearing surface comprises a radially outwardly-facing edge on the second shaft.

14. The system for processing seeds according to claim 13, wherein the first helical thread is mated with the second helical thread, such that the radially outwardly-facing edge on the first helical thread faces the radially outwardly-facing edge on the second shaft, the clearance being defined between the radially outwardly-facing edge on the first helical thread and the radially outwardly-facing edge on the second shaft.

*15. A system for processing seeds that are present in crop material collected by an agricultural harvester, the system comprising (i) a rotatable member, (ii) a concave disposed around the rotatable member, and (iii) a clearance defined between the rotatable member and the concave that is adapted to receive a flow of crop material containing seeds, wherein rotation of the rotatable member is configured to damage the seeds present in the crop material located within the clearance and prevent the seeds from germinating after exiting the system, and (iv) a deflector that is movable between a lowered position, in which the entry of the flow of crop material into the clearance is prevented by the deflector, and a raised position, in which the entry of the flow of crop material into the clearance is permitted by the deflector.*

*16. The system of claim 15, wherein the deflector is pivotably mounted to a frame of the system.*

*17. An agricultural harvester comprising the system of claim 15.*

*18. The system of claim 15, wherein the rotatable member is a drum.*

*19. The system of claim 18, wherein the drum comprises projecting elements extending radially outwardly from the drum for driving the seeds against the concave.*

*20. The system of claim 19, wherein the drum comprises an outer surface and the projecting elements extend radially outwardly from the outer surface.*

*21. The system of claim 19, wherein the concave comprises projecting elements extending radially inwardly from the concave for contacting the seeds.*

*22. The system of claim 21, wherein the projecting elements of the concave are positioned to register with passages defined between adjacent projecting elements of the drum.*

*23. The system of claim 15 wherein the concave is mounted stationary relative to the rotatable member.*

*24. The system of claim 15, wherein the concave is a cylindrical body comprising a hollow region in which the rotatable member is positioned.*

*25. The system of claim 15, further comprising a rubber mat positioned on top of the deflector, wherein the rubber mat is configured to oscillate and create a moving surface on top of the deflector for maintaining movement of material over the deflector when the deflector is maintained in the lowered position.*

*26. The system of claim 15, wherein the system is movably mounted between a stowed position in which the system is maintained in an inoperable condition, and a deployed position in which the system is maintained in an operable condition.*

*27. The system of claim 26, wherein the system comprises a pivot assembly, and the system is configured to pivot between the stowed and deployed positions by way of the pivot assembly.*

*28. An agricultural harvester comprising the system of claim 26.*

*29. The system of claim 26, wherein the system is configured to be moved into a path of crop residue when seed processing is required, and moved out of the path of crop residue when seed processing is not desired.*

*30. The system of claim 26, further comprising a pan that is configured to be mounted to an opening in the harvester when the system is moved to the stowed position.*

*31. The system of claim 26, wherein an axis of rotation of the rotatable member extends transversely.*

*32. The system of claim 26, wherein the concave is a cylindrical body comprising a hollow region in which the rotatable member is positioned.*

*33. The system of claim 26, wherein the system is configured to move downwardly with respect to the harvester.*

*34. The system of claim 26, wherein a position of the concave is adjustable relative to the rotatable member for changing a size of the clearance.*

*35. The system of claim 1, wherein the drum is a cylinder.*

*36. The system of claim 35, wherein the drum is a hollow cylinder.*

*37. The system of claim 1 further comprising a deflector that is movable between a lowered position, in which the entry of the flow of crop material into the clearance is prevented by the deflector, and a raised position, in which the entry of the flow of crop material into the clearance is permitted by the deflector.*

*38. The system of claim 15, wherein the rotatable member includes projecting elements for driving the seeds against the concave.*

*39. The system of claim 15, wherein the deflector covers a passageway leading to an inlet of the concave.*

* * * * *